US008993090B2

(12) United States Patent
Boulet et al.

(10) Patent No.: US 8,993,090 B2
(45) Date of Patent: Mar. 31, 2015

(54) PART FOR AND METHOD OF REPAIRING A DAMAGED STRUCTURE, IN PARTICULAR AN AIRFRAME SKIN, AND A REPAIR KIT FOR IMPLEMENTING IT

(75) Inventors: Nicolas Boulet, Toulouse (FR); Olivier Chaume, Toulouse (FR); Frédéric Chelin, Encausse (FR)

(73) Assignee: Airbus Operations (S.A.S.), Toulouse Cedex (FR)

( * ) Notice: Subject to any disclaimer, the term of this patent is extended or adjusted under 35 U.S.C. 154(b) by 413 days.

(21) Appl. No.: 13/344,054

(22) Filed: Jan. 5, 2012

(65) Prior Publication Data

US 2012/0177878 A1 Jul. 12, 2012

(30) Foreign Application Priority Data

Jan. 7, 2011 (FR) ...................... 11 50129

(51) Int. Cl.
*B32B 3/24* (2006.01)
*B32B 43/00* (2006.01)
*B29C 73/14* (2006.01)
*B23P 6/00* (2006.01)
(Continued)

(52) U.S. Cl.
CPC ............. *B64F 5/0081* (2013.01); *B32B 19/04* (2013.01); *B23P 6/005* (2013.01); *B32B 17/04* (2013.01); *B29C 2073/264* (2013.01); *B32B 17/067* (2013.01); *B32B 3/266* (2013.01); *B23P 2700/01* (2013.01); *B29C 73/14* (2013.01)
USPC ............. 428/137; 428/63; 428/172; 428/223; 156/91; 156/92; 156/94; 156/98; 156/293; 29/402.09; 29/402.11; 29/402.12

(58) Field of Classification Search
CPC ............................... B29C 73/14; B64F 5/0081
USPC .............................. 29/402.14, 402.15
See application file for complete search history.

(56) References Cited

U.S. PATENT DOCUMENTS 1,131,745 A 3/1915 Stephens
2,692,425 A * 10/1954 Martin ................. 29/402.12
(Continued)

FOREIGN PATENT DOCUMENTS

DE 102008021788 11/2009
JP 04108138 A * 4/1992 ............ D03D 25/00

OTHER PUBLICATIONS

French Patent Office, French Search Report FR 1150129, Sep. 14, 2011 (2 pgs), and Written Opinion (4 pgs).

*Primary Examiner* — Jeff Vonch
(74) *Attorney, Agent, or Firm* — Wood, Herron & Evans, LLP

(57) ABSTRACT

A repair part enables rapid and efficient repair of damaged metal structures, in particular airframe fuselage skins having internal and external faces, without necessitating any additional thickness compromising the transmission of waves. To this end, the repair part includes a double internal/external plate adapted to be fastened to the internal face and the external face of the metal structure, respectively. The repair part also includes a central hub connecting the internal plate and the external plate and forming a groove between the plates. The part is constituted of a single composite material block, and a glass ply, lining the groove, may be positioned between the plates and the structure. The hub may have passing through it at least one orifice adapted to allow connections to pass through the structure.

8 Claims, 1 Drawing Sheet

(51) Int. Cl.
  *B64F 5/00* (2006.01)
  *B32B 17/04* (2006.01)
  *B32B 19/04* (2006.01)
  *B29C 73/26* (2006.01)
  *B32B 17/06* (2006.01)
  *B32B 3/26* (2006.01)

(56) References Cited

U.S. PATENT DOCUMENTS

| | | | |
|---|---|---|---|
| 4,502,092 A * | 2/1985 | Bannink et al. | 361/218 |
| 4,517,038 A * | 5/1985 | Miller | 156/98 |
| 4,759,812 A | 7/1988 | Miller | |
| 4,820,564 A * | 4/1989 | Cologna et al. | 428/63 |
| 4,858,853 A * | 8/1989 | Westerman et al. | 244/119 |
| 4,865,792 A * | 9/1989 | Moyer | 264/249 |
| 4,961,799 A | 10/1990 | Cologna et al. | |
| 5,190,611 A * | 3/1993 | Cologna et al. | 156/98 |
| 5,868,886 A * | 2/1999 | Alston et al. | 156/98 |
| 6,820,334 B2 * | 11/2004 | Kebbede et al. | 464/98 |
| 7,628,879 B2 * | 12/2009 | Ackerman | 156/98 |
| 7,650,678 B2 * | 1/2010 | Bogue | 29/402.09 |
| 7,740,028 B1 | 6/2010 | Wilson et al. | |
| 8,152,952 B2 * | 4/2012 | Whitworth et al. | 156/293 |
| 2007/0009712 A1 * | 1/2007 | Roth | 428/172 |
| 2009/0282664 A1 | 11/2009 | Holzhuter et al. | |

* cited by examiner

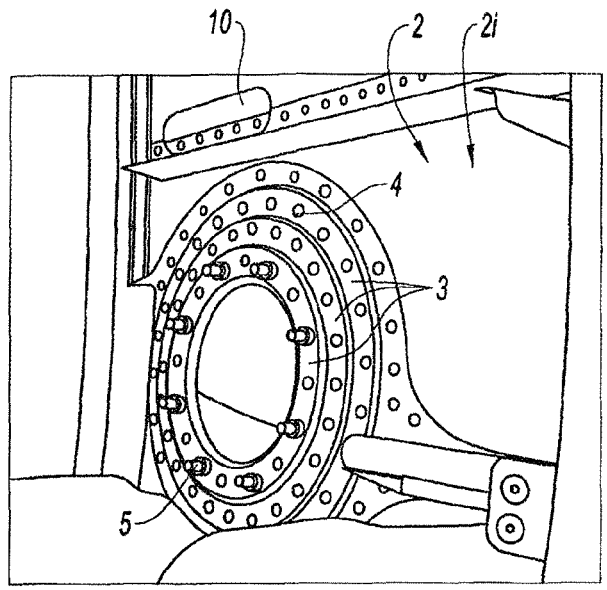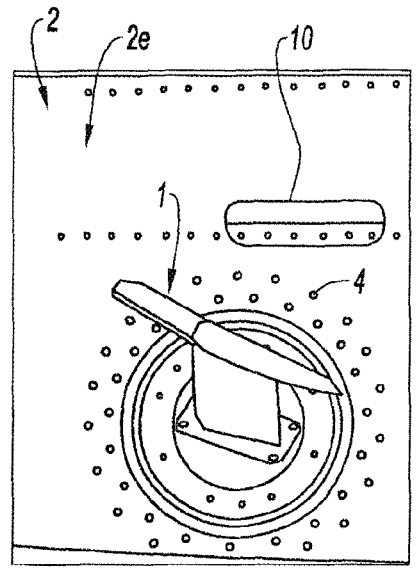
Fig. 1a  Fig. 1b
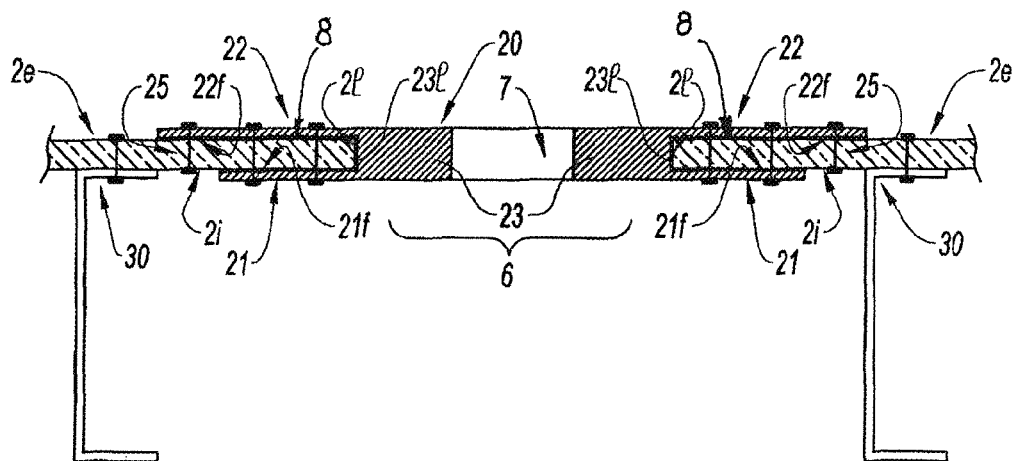
Fig. 2

PART FOR AND METHOD OF REPAIRING A DAMAGED STRUCTURE, IN PARTICULAR AN AIRFRAME SKIN, AND A REPAIR KIT FOR IMPLEMENTING IT

TECHNICAL FIELD

The invention relates to a part for repairing a damaged metal structure, in particular an airframe fuselage skin, and a repair method using such a part. It also provides a repair kit adapted to implement this method.

BACKGROUND

An airframe traditionally has a metal, mainly aluminium alloy, fuselage put together by assembling frames, stringers and panels. Areas for probes, doors, other openings and the like are cut out from the panels of the fuselage. The skin of the fuselage is then generally reinforced internally, around the cut-out, by a stepped local increase in thickness.

If these thick (conventionally greater than 4 mm thick) reinforcing areas suffer serious damage—following an incident in service, fire, corrosion, etc.—the damaged skin is conventionally cut away and a thick external plate affixed.

The use of external plates is described for example in U.S. Pat. No. 4,517,038. In that document it is recommended to cut away the damaged part to form a preselected opening, to introduce into this opening an assembly—composed of a stack of layers of fibres, of substantially the same size as the opening, joined to a metal plate of greater size—and to fix the plate by means of rivets to the skin of the damaged structure. Such a repair is not reliable, in particular with regard to fire resistance, and causes aerodynamic problems, interfering with probes if it is located near a probe.

It is known from the patent document EP 0 471 923 to repair a damaged non-load-bearing airframe structure by fixing an external fire-resistant plate constituted of a layer of woven glassfibre fabric impregnated with a thermosetting resin. The plate is fixed by a plurality of mechanical clamping means.

If environmental constraints multiply, this type of repair is difficult to apply: for aerodynamic reasons the thickness of the external plates must be limited or even eliminated in the vicinity of probes so as not to interfere with the flow of air, as such interference may falsify the measurements from the probes.

The plate is shaped manually or machined from thick sheet metal. Reworking is generally necessary to reduce the thickness of its contour along the lines of external fixing of the plate. This method is therefore lengthy and difficult and induces internal mechanical stresses linked to the fabrication process.

Moreover, during assembly, there are additional installation stresses, linked mainly to manufacturing tolerances. Moreover, misalignment of the neutral fibres also induces secondary bending stresses at the junction.

Finally, the repair may be limited in time with additional intermediate inspections: the final solution is always to replace the entire panel, which is the worst case scenario in terms of cost and down time.

SUMMARY OF THE INVENTION

The invention aims to circumvent these repair constraints and in particular to eliminate the installation constraints. To this end, it proposes a double internal/external plate constituted by a particular material.

To be more precise, the present invention provides a part for repairing a damaged structure having an external face and an internal face, in particular an airframe fuselage skin. This part comprises a substantially planar double internal/external plate, adapted to be fastened to the internal face and the external face, respectively, of the structure, and a central hub connecting the internal and external plates to form a groove between these plates, the part being constituted of a single block of composite material.

Such a repair part enables elimination of internal stresses and reduced misalignment of the neutral fibres thanks to the equilibrium of the forces induced by the double plate.

In particular embodiments:
the plates have a size and a thickness determined as a function of the damaged location;
a glass ply lining the groove is positioned between the plates and the structure;
the hub has passing through it at least one orifice adapted to allow connections to pass through the structure;
the internal plate may comprise a plurality of plies for covering and fastening it to elements situated in a nearby environment.

The invention also provides a method of repairing a structure, in particular a metal or composite structure, using the above repair part. Such a method includes steps of shaping the part as defined hereinabove by cutting a composite material preform, forming an enlarged opening in the structure enabling removal of the damaged part, installing the plates on either side of the metal structure against the internal and external faces of that structure, the part having a profile which then substantially espouses that of the structure at the opening, fastening together the faces of the structure and the respective facing faces of the plates, and transverse mechanical fixing together of at least one of the plates and the metal structure lying between those plates.

In particular embodiments:
the faces of the plates and the hub to be fastened to the faces of the structure are lined when cool, such cool lining facilitating shaping of the part;
the lining is formed by a glass ply so that the fastening together of the repair part and the faces of the metal structure is effected via that ply;
the internal plate is plied to enable adaptation of the thickness of this plate as a function of other structures it will overlap.

The invention further provides a repair kit for use in this method. This kit is composed of a repair part as defined hereinabove that may take the form of dry plies, preferably accompanied by a pot of resin for fastening the part to the faces of the structure, or plates of fibres buried in a thermoplastic matrix. This kit may advantageously include mechanical means for fixing the part to the structure.

BRIEF DESCRIPTION OF THE FIGURES

Other data, features and advantages of the present invention will become apparent on reading the following description of one embodiment thereof given with reference to the appended figures.

FIG. 1a shows an internal view of an aircraft fuselage portion damaged by an impact in the vicinity of a Pitot probe.

FIG. 1b shows an external view of an aircraft fuselage portion damaged by an impact in the vicinity of a Pitot probe.

FIG. 2 shows a diagrammatic view in cross section of a repair part of one embodiment of the invention after being fastened to the skin of the fuselage portion shown in FIGS. 1a and 1b.

DETAILED DESCRIPTION

In the detailed description, the qualifiers "interior" or "internal" and "exterior" or "external" respectively refer to the closed space defined in the interior of the fuselage of the aircraft and the space situated outside that closed space.

Referring to FIG. 1b, a speed probe 1, a Pitot tube in the example shown, is fixed to an aluminium alloy aircraft fuselage skin 2. The fixing is reinforced internally, as is apparent in FIG. 1a, by concentric metal plies 3 fastened by rivets 4 and bolts 5. A damaged portion 10, formed by an impact, is located in the vicinity of the probe 1. This portion cannot be repaired by the traditional means of adding an external plate, as explained hereinabove, because of the too great proximity of the probe and its reinforcement area.

The invention uses a repair part, such as the repair part 20 shown by way of non-limiting example in the FIG. 2 sectional view. This part 20 for repairing the damaged metal portion 10 of the fuselage extends to either side of the damaged portion 10, in particular over the external face 2e and the internal face 2i of the skin 2 of the fuselage.

The repair part 20 forms part of a kit chosen as a function of the dimensions of the enlarged opening 6 delimited by a lateral face 2L and produced in the skin 2 in order to remove the damaged part 10. Each kit comprises a repair part of predefined size within a range and a pot of resin for fastening the part to the faces of the structure to be repaired, as well as means for transverse fixing of the part to the structure.

The part 20 consists of a block of composite material, based on carbon fibres in the present example, cut to shape from a composite material preform.

This part 20 is formed of two plates that are planar or slightly curved—i.e. substantially parallel to the skin of the fuselage 2—namely an internal plate 21 and an external plate 22 connected to each other by a central hub 23. The facing faces 21f and 22f of these plates 21 and 22, facing toward the skin of the fuselage 2, form a peripheral groove 25, the lateral face 23L of the hub 23 constituting the bottom of the groove 25. In this example the hub 23 has passing through it at least one orifice 7 adapted to allow system connections, for example an electrical cable, to pass between the exterior and the interior of the skin of the fuselage.

The plates 21 and 22 are fastened transversely to the internal face 2i and the external face 2e of the skin 2 by rivets 4. These rivets join the skin of the fuselage and the two plates 21 and 22, or at least one of them, as a function of the configuration.

For reasons of galvanic corrosion between carbon and aluminium, the faces 21f and 22f of the plates 21 and 22 and the lateral face 23l of the hub 23 are lined beforehand so as to line the groove 25. This lining takes the form of a glass ply 8 positioned between the plates and the skin so that the fastening together of the plates 21, 22 and the facing faces 2i and 2e of the skin 2 of the fuselage is effected via this ply. The internal plate 2i is advantageously plied to adapt its thickness to its environment. Thus other surrounding reinforcing elements or parts of more or less complex shape, such as supports 30, may be covered by and fastened to the internal plate 2i.

When fitting the repair part 20, the plates 21 and 22 are installed on either side of the skin of the fuselage 2 against the internal face 2i and the external face 2e of that skin. The part 20 has a profile that substantially espouses that of the skin 2 in the opening 6. The faces 2i and 2e of the fuselage skin 2 and the faces 21f and 22f of the plates 21 and 22 respectively brought into contact via the glass ply 8 are fastened together using the resin provided in the kit. Fitting is completed by the transverse fixing of the rivets 4.

The invention is not limited to the examples described and shown. It is for example possible to provide circular parts with a central axis or other derived shapes (elliptical, oblong, etc.). Moreover, the composite material of the repair parts may be based on fibres of carbon, glass or other materials (aramid, calcium carbide, etc.). Moreover, the invention is not limited to the aeronautical field and may be applied to the automotive field, for example.

The invention claimed is:

1. A repair part for repairing a damaged location in an aircraft fuselage skin having an external face and an internal face, wherein the repair part comprises:
   a substantially planar double internal/external plate, with the internal plate and the external plate adapted to be fastened to the internal face and the external face, respectively, of the aircraft fuselage skin;
   a central hub connecting the internal plate and the external plate to form a groove between the internal and external plates, wherein the internal and external plates and the central hub are integrally formed as a unitary block of composite material; and
   a glass ply lining the groove defined by the internal and external plates and the central hub of the unitary block of composite material, the glass ply configured to fasten directly to the aircraft fuselage skin between the aircraft fuselage skin and the unitary block for inhibiting corrosion between the aircraft fuselage skin and the unitary block.

2. The repair part according to claim 1, wherein the internal and external plates have a size and a thickness determined as a function of the damaged location.

3. The repair part according to claim 1, wherein the central hub further comprises at least one orifice adapted to allow connections to pass through the aircraft fuselage skin.

4. The repair part according to claim 1, wherein the internal plate further comprises a plurality of plies for covering and fastening the internal plate to structure situated in a nearby environment.

5. The repair part of claim 1, wherein the unitary block of composite material is based on fibres different from those of the glass ply.

6. A repair method of repairing a damaged location in an aircraft fuselage skin having an external face and an internal face, the repair method comprising:
   providing a repair part comprising:
      a substantially planar double internal/external plate, with the internal plate and the external plate adapted to be fastened to the internal face and the external face, respectively, of the aircraft fuselage skin; and
      a central hub connecting the internal plate and the external plate to form a groove between the internal and external plates, wherein the internal and external plates and the central hub are integrally formed as a unitary block of composite material,
      a glass ply lining the groove defined by the internal and external plates and the central hub of the unitary block of composite material, the glass ply configured to fasten directly to the aircraft fuselage skin between the aircraft fuselage skin and the unitary block for inhibiting corrosion between the aircraft fuselage skin and the unitary block,
   shaping the repair part by cutting a composite material preform defining the single block of composite material to be sized for the damaged location in the aircraft fuselage skin, forming an enlarged opening in the aircraft fuselage skin enabling removal of the damaged location, installing the internal and external plates on either side of the aircraft fuselage skin against the internal and external faces, fastening together the internal and external faces of the structure with facing faces of the internal and external plates, respectively, via the glass ply, and transverse mechanical fixing together of at least one of the internal and external plates with the aircraft skin.

7. The repair method according to claim 6, wherein the internal plate is plied to enable adaptation of the thickness of the internal plate as a function of structures the internal plate will overlap upon installation.

8. A repair kit, comprising:

a repair part which takes the form of dry plies or plates of fibres buried in a thermoplastic matrix, the repair part comprising:

a substantially planar double internal/external plate, with the internal plate and the external plate adapted to be fastened to the internal face and the external face, respectively, of the aircraft fuselage skin;

a central hub connecting the internal plate and the external plate to form a groove between the internal and external plates, wherein the internal and external plates and the central hub are integrally formed as a unitary block of composite material; and a glass ply lining the groove defined by the internal and external plates and the central hub of the unitary block of composite material, the glass ply configured to fasten directly to the aircraft fuselage skin between the aircraft fuselage skin and the unitary block for inhibiting corrosion between the aircraft fuselage skin and the unitary block.

* * * * *